(12) United States Patent
Higdon et al.

(10) Patent No.: US 12,121,020 B1
(45) Date of Patent: Oct. 22, 2024

(54) WING CONNECTOR SYSTEM

(71) Applicant: Higdon Outdoors, LLC, Paducah, KY (US)

(72) Inventors: Benjamin R. Higdon, Paducah, KY (US); John Higdon, Paducah, KY (US)

(73) Assignee: Higdon Outdoors, LLC, Paducah, KY (US)

( * ) Notice: Subject to any disclaimer, the term of this patent is extended or adjusted under 35 U.S.C. 154(b) by 189 days.

(21) Appl. No.: 17/842,525

(22) Filed: Jun. 16, 2022

Related U.S. Application Data

(60) Provisional application No. 63/211,433, filed on Jun. 16, 2021.

(51) Int. Cl.
*A01M 31/06* (2006.01)

(52) U.S. Cl.
CPC .................................. *A01M 31/06* (2013.01)

(58) Field of Classification Search
CPC .............................. A01M 31/06; A63H 27/008
See application file for complete search history.

(56) References Cited

U.S. PATENT DOCUMENTS

| | | | | |
|---|---|---|---|---|
| 6,493,980 | B1* | 12/2002 | Richardson | A01M 31/06 43/3 |
| 9,216,823 | B2* | 12/2015 | Matte | A63H 27/008 |
| 9,258,993 | B2* | 2/2016 | Szechenyi | F16H 21/44 |
| 9,717,236 | B2* | 8/2017 | Szechenyi | A01M 31/06 |
| 10,932,462 | B2 | 3/2021 | Denmon | |
| 2013/0239454 | A1* | 9/2013 | Szechenyi | A01M 31/06 43/3 |
| 2016/0120169 | A1* | 5/2016 | Szechenyi | F16H 21/44 74/99 R |

* cited by examiner

*Primary Examiner* — Jessica B Wong
(74) *Attorney, Agent, or Firm* — C Brandon Browning; Maynard Nexsen PC

(57) ABSTRACT

The present disclosure is directed to a wing connector system and methods of using same for folding of decoy wings during transport. The wing connector system includes a wing adapter for coupling to decoy wings, a motor shaft adapter for coupling to a motor shaft of the decoy, and a fastener for moveably coupling the wing adapter to the motor shaft adapter. When the fastener is rotated in a first direction, it restricts movement of the wing adapter relative to the motor shaft adapter, and when the fastener is rotated in a second direction, it allows movement of the wing adapter relative to the motor shaft adapter. When the wing adapter is extended from the motor shaft adapter, rotation is possible, allowing for the folding of attached decoy wings during transport. This folding allows transport to occur without damaging the decoy or requiring the disconnection of decoy wings.

4 Claims, 14 Drawing Sheets

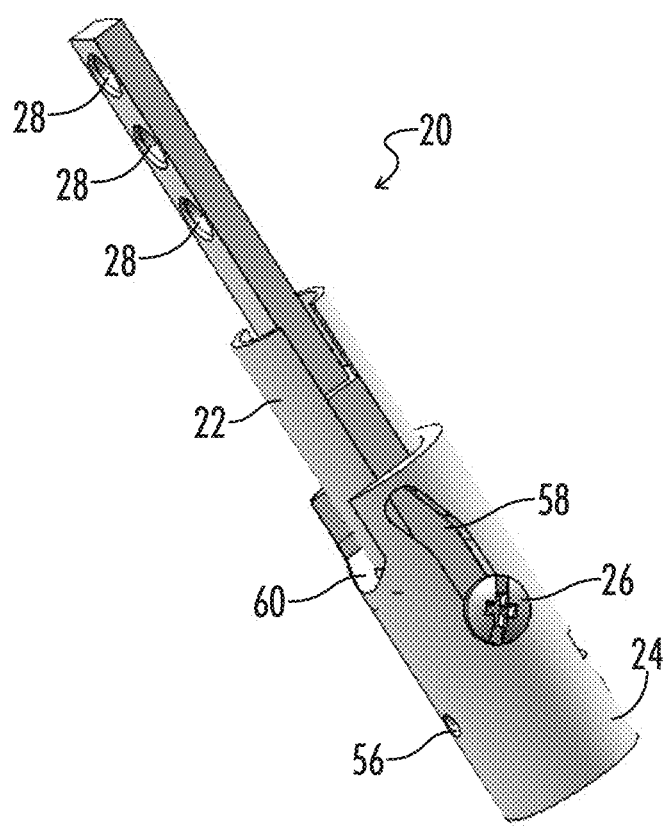
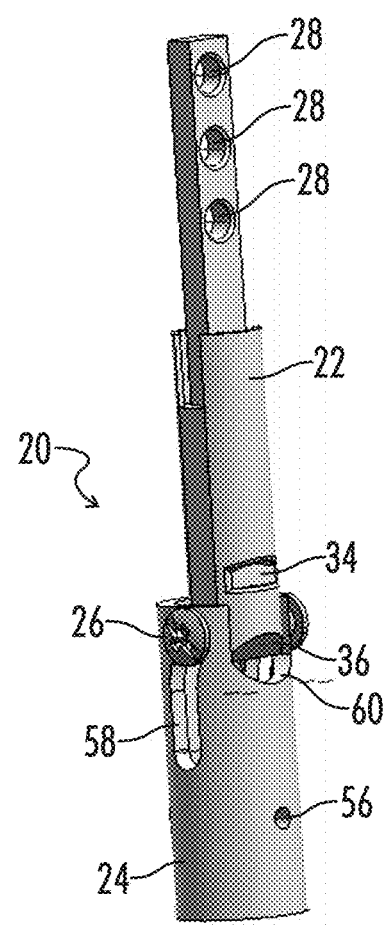
*FIG. 9*  *FIG. 10*

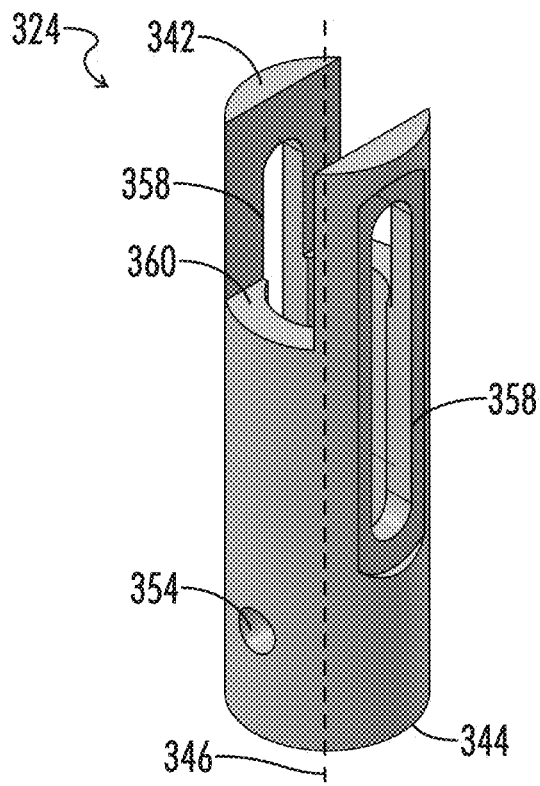 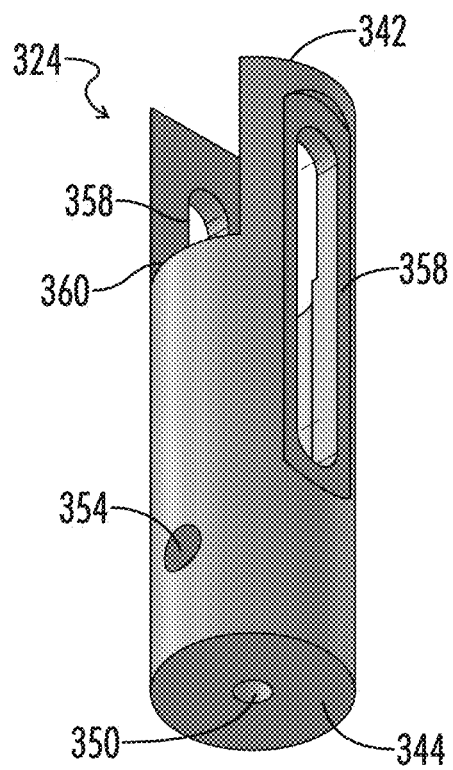
FIG. 25A  FIG. 25B
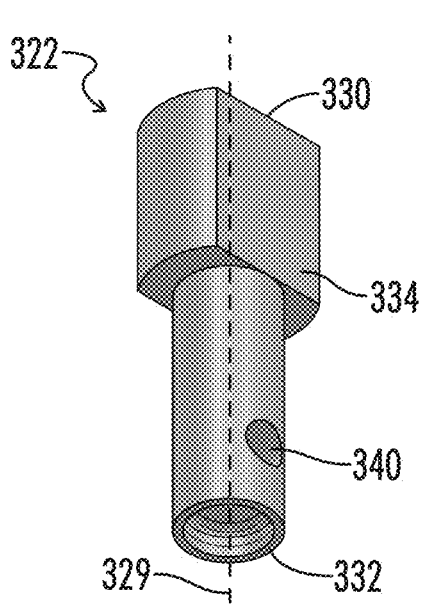 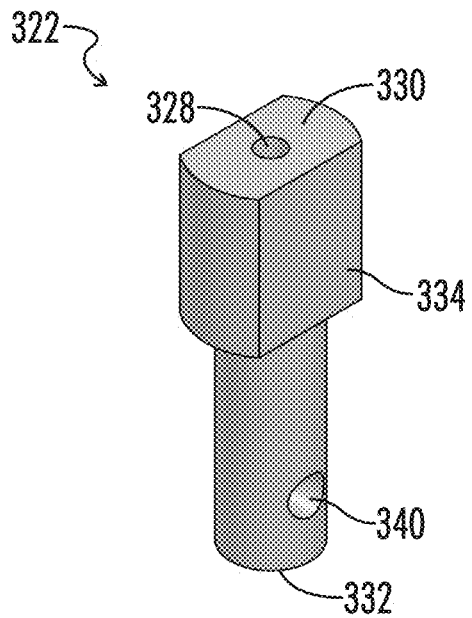
FIG. 26A  FIG. 26B

WING CONNECTOR SYSTEM

RELATED APPLICATIONS

This application claims priority to U.S. Provisional Patent Application No. 63/211,433 filed on Jun. 16, 2021, titled "Wing Connector System", the entire contents of which are incorporated herein.

TECHNICAL FIELD

The present invention is directed to a wing connector system for a winged decoy that allows wing folding while wings remain attached to the decoy motor shaft.

BACKGROUND OF INVENTION

Decoys resembling animals are used to attract game or other desirable animals to locations near the decoys. For example, hunters utilize decoys to attract game to a particular location, while animal sighting enthusiasts use decoys to attract desirable animals for viewing and photographing within the proximity of the decoy. The movement of animals to a location near the decoy allows hunters to draw the animals within range of a weapon and allows the viewing or photographing of animals within range of a camera or binoculars.

Decoys typically function by resembling an animal similar to one that is to be attracted and by moving, sounding, or otherwise behaving like that animal. For example, a waterfowl decoy is designed to attract other waterfowl. However, stationary decoys may fail to be recognized by moving animals, such as flying waterfowl or other avian targets. Thus, motion decoys that mimic the movement of the animals which they resemble are designed to attract target animals, especially from afar, where motion may be a significant factor in target animal sighting and recognition.

Current motion decoys include at least one motor shaft that is attached to moving components, such as wings. This configuration, while permitting motion of the decoy, limits use of the decoy to a particular area over a period of time, as relocation of the decoy involves time consuming steps of wing removal for stowage and transport. Removal of wings can further result in wing damage or loss during transport. The present invention is directed to a different configuration of a spinning wing decoy assembly with wing connection systems that permit folding of the decoy wings while the wings remain attached to a motor shaft. By changing the wing configuration to allow folding, the complete decoy can more easily and quickly be moved between locations, stored, or transported. Thus, a user is not limited to use of the decoy in one location for long periods of time and the user can more securely transport and stow the decoy without concern for the potential loss of the wings.

SUMMARY OF THE INVENTION

The present invention is directed to a wing connector system and methods of using same. In one aspect of the invention, there is provided a foldable wing connector system including at least one wing adapter for attachment to a wing member of a winged decoy, each wing adapter including a wing adapter first end configured to be coupled to the wing member, a wing adapter second end, and a wing adapter longitudinal axis spanning a length of the wing adapter. The foldable wing connector system includes at least one motor shaft adapter for attachment to a motor shaft of a motor located within the winged decoy, each motor shaft adapter including a motor shaft adapter first end configured to receive the wing adapter second end therethrough, a motor shaft adapter second end configured to be coupled to the motor shaft; and a motor shaft adapter longitudinal axis spanning a length of the motor shaft adapter The foldable wing connector system further includes at least one fastening means configured to moveably connect the wing adapter within the motor shaft adapter, and to define movement of the wing adapter within the motor shaft adapter along at least one sliding groove of the motor shaft adapter. When the at least one fastening means connects the wing adapter within the motor shaft adapter and the at least one fastening means is located nearest the motor shaft adapter second end along the at least one sliding groove, the foldable wing connector system is in an operating configuration where the wing adapter longitudinal axis is approximately co-linear with the motor shaft longitudinal axis. When the at least one fastening means connects the wing adapter within the motor shaft adapter and the at least one fastening means is located nearest the motor shaft adapter first end along the at least one sliding groove, the foldable wing connector system is in an extended configuration where the wing adapter and attached wing member are configured to be folded in a manner where the wing adapter longitudinal axis is rotated up to an angle of greater than 90 degrees relative to motor shaft longitudinal axis.

In some instances, the wing adapter first end includes at least one wing reception hole for coupling the wing member to the wing adapter. In some instances, the wing adapter includes at least one fastener hole spanning the wing adapter perpendicular to the wing adapter longitudinal axis and located near the wing adapter second end, the at least one fastener hole for receiving the fastening means. In some cases, the fastening means is configured to connect the wing adapter with the motor shaft adapter when the at least one fastener hole is aligned with the at least one sliding groove and the fastening means is inserted through the at least one fastener hole and the at least one sliding groove. In some instances, the motor shaft adapter second end includes at least one motor shaft reception hole for coupling the motor shaft adapter to the motor shaft. In some instances, the motor shaft adapter includes at least one motor shaft locking hole perpendicular to the motor shaft adapter longitudinal axis and located near the motor shaft adapter second end, the at least one motor shaft locking hole configured to receive a locking fastener to lock the coupling of the motor shaft adapter to the motor shaft. In some instances, a pair of folding cutouts extend from the motor shaft adapter first end and are configured to permit folding of the wing adapter when the foldable wing connector system is in the extended configuration. In some instances, the at least one fastening means is a locking knob configured to restrict movement of the wing adapter relative to the motor shaft adapter when the locking knob is rotated in a first direction, and configured to allow movement of the wing adapter relative to the motor shaft adapter when the locking knob is rotated in a second direction.

In another aspect of the invention, there is provided a spinning winged decoy. The spinning winged decoy includes at least one wing member extending from a body of the spinning winged decoy, at least one motor with a motor shaft located within the body of the spinning winged decoy, and at least one wing connector system for connecting each wing member to one motor shaft. Each wing connector system includes at least one wing adapter for attachment to the wing member, each wing adapter including a wing adapter first end coupled to the wing member, a wing adapter second end, and a wing adapter longitudinal axis spanning a length of the wing adapter. Each wing connector system also includes at least one motor shaft adapter for attachment to the motor shaft, each motor shaft adapter including a motor shaft adapter first end receiving the wing adapter second end therethrough, a motor shaft adapter second end coupled to the motor shaft, and a motor shaft adapter longitudinal axis spanning a length of the motor shaft adapter. Each wing connector system further includes at least one fastening means moveably connecting the wing adapter within the motor shaft adapter and defining movement of the wing adapter within the motor shaft adapter along at least one sliding groove of the motor shaft adapter. When the at least one fastening means is located nearest the motor shaft adapter second end along the at least one sliding groove, the foldable wing connector system is in an operating configuration where the wing adapter longitudinal axis is approximately co-linear with the motor shaft longitudinal axis. When the at least one fastening means is located nearest the motor shaft adapter first end along the at least one sliding groove, the foldable wing connector system is in an extended configuration where the wing adapter and attached wing member are configured to be folded in a manner where the wing adapter longitudinal axis is rotated up to an angle of greater than 90 degrees relative to motor shaft longitudinal axis.

In some instances, the wing adapter first end includes at least one wing reception hole for coupling the wing member to the wing adapter. In some instances, the wing adapter includes at least one fastener hole spanning the wing adapter perpendicular to the wing adapter longitudinal axis and located near the wing adapter second end, the at least one fastener hole for receiving the fastening means. In some cases, the fastening means connects the wing adapter with the motor shaft adapter by insertion through aligned at least one fastener hole and at least one sliding groove. In some instances, the motor shaft adapter second end includes at least one motor shaft reception hole for coupling the motor shaft adapter to the motor shaft. In some instances, the motor shaft adapter includes at least one motor shaft locking hole perpendicular to the motor shaft adapter longitudinal axis and located near the motor shaft adapter second end, the at least one motor shaft locking hole receiving a locking fastener for locking of the motor shaft adapter to the motor shaft. In some instances, a pair of folding cutouts extend from the motor shaft adapter first end and permit folding of the wing adapter when the wing connector system is in the extended configuration. In some instances, the at least one fastening means is a locking knob configured to restrict movement of the wing adapter relative to the motor shaft adapter when the locking knob is rotated in a first direction, and configured to allow movement of the wing adapter relative to the motor shaft adapter when the locking knob is rotated in a second direction.

In yet another aspect of the invention, there is provided a method of transporting a winged decoy without detaching wing members. The method includes first providing the winged decoy comprising at least one wing member connected to a motor shaft within the winged decoy through a wing connector system. The wing connector system includes at least one wing adapter for attachment to the wing member, each wing adapter including a wing adapter first end coupled to the wing member, a wing adapter second end, and a wing adapter longitudinal axis spanning a length of the wing adapter. The wing connector system also includes at least one motor shaft adapter for attachment to the motor shaft, each motor shaft adapter including a motor shaft adapter first end receiving the wing adapter second end therethrough, a motor shaft adapter second end coupled to the motor shaft; and a motor shaft adapter longitudinal axis spanning a length of the motor shaft adapter. The wing connector system further includes at least one fastening means moveably connecting the wing adapter within the motor shaft adapter and defining movement of the wing adapter within the motor shaft adapter along at least one sliding groove of the motor shaft adapter.

The method includes rotating the at least one fastening means in a first direction to allow movement of the wing adapter relative to the motor shaft adapter. The at least one fastening means and the wing adapter are moved along the at least one sliding groove so that the at least one fastening means becomes located near the motor shaft adapter first end and the wing connector system is in an extended configuration. The at least one wing member is folded in a manner where the wing adapter longitudinal axis is rotated up to an angle of greater than 90 degrees relative to motor shaft longitudinal axis. Then, the winged decoy is transported so that substantially no damage to the winged decoy occurs through the folding of the at least one wing member.

In some instances, the method further includes the step of folding the at least one wing member in a manner where the wing adapter longitudinal axis is approximately co-linear with the motor shaft longitudinal axis, where the step occurs after the transporting. In some instances, the method further includes the step of moving the at least one fastening means and the wing adapter along the at least one sliding groove so that the at least one fastening means becomes located near the motor shaft adapter second end and the wing connector system is in an operating configuration, where the step occurs after the wing adapter longitudinal axis is approximately co-linear with the motor shaft longitudinal axis. In some instances, the method further includes the step of rotating the at least one fastening means in a second direction to restrict movement of the wing adapter relative to the motor shaft adapter, where the step occurs after the wing connector system is in an operating configuration.

A further understanding of the nature and advantages of the present invention will be realized by reference to the remaining portions of the specification and the drawings.

BRIEF DESCRIPTION OF DRAWINGS

The present disclosure same can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 9 is a side perspective view of the assembled first embodiment wing connector system of FIG. 5 in an operating position.

FIG. 10 is a top perspective view of the assembled first embodiment wing connector system of FIG. 5 in an extended position.

FIG. 25A is a side perspective view of a motor shaft adapter of the fourth embodiment of the wing connector system of FIG. 24.

FIG. 25B is a bottom perspective view of the motor shaft adapter of the fourth embodiment of the wing connector system of FIG. 24.

FIG. 26A is a bottom perspective view of a wing adapter of the fourth embodiment of the wing connector system of FIG. 24.

FIG. 26B is a side perspective view of the wing adapter of the fourth embodiment of the wing connector system of FIG. 24.

DETAILED DESCRIPTION OF THE INVENTION

The present disclosure is directed to wing connector systems for the attachment of foldable decoy wings to a motor shaft. The ability to fold wings of the decoy allows for easy and secure transport and storage of the decoy without the need to remove wings. Winged decoy systems with foldable wings reduce potential damage to or loss of wings relative to typical decoy systems where wings must be removed prior to relocation, transport, or storage. Wing connector systems are reconfigured relative to those of typical motion decoy systems, where the disclosed wing connector systems include components for folding of the wing members of the decoy and while wing members are still attached to the motor shaft of the decoy assembly.

As used herein, "game" refers to any animal desired to be lured by or attracted to the decoy. Game may include animals targeted in hunting, though other activities are contemplated by the present disclosure. For example, game includes animals targeted by outdoor enthusiasts for viewing or photographing. Game includes fowl, such as waterfowl.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., "at least one" of what is described), unless the context clearly indicates otherwise. In every case, use of singular articles and pronouns should be interpreted to support claims to at least one of what is described, and to support claims to exactly one of what is described.

Terms such as "at least one of A and B" should be understood to mean "only A, only B, or both A and B." The same construction should be applied to longer list (e.g., "at least one of A, B, and C").

The present disclosure includes several embodiments of wing connector systems. FIGS. 1 through 11 illustrate a first embodiment of the wing connector system 20, FIGS. 12 through 18 illustrate a second embodiment of the wing connector system 120, FIGS. 19 through 23 describe a third embodiment of the wing connector system 220, while FIGS. 24 through 29 describe a fourth embodiment of the wing connector system 320.

Figure 1:
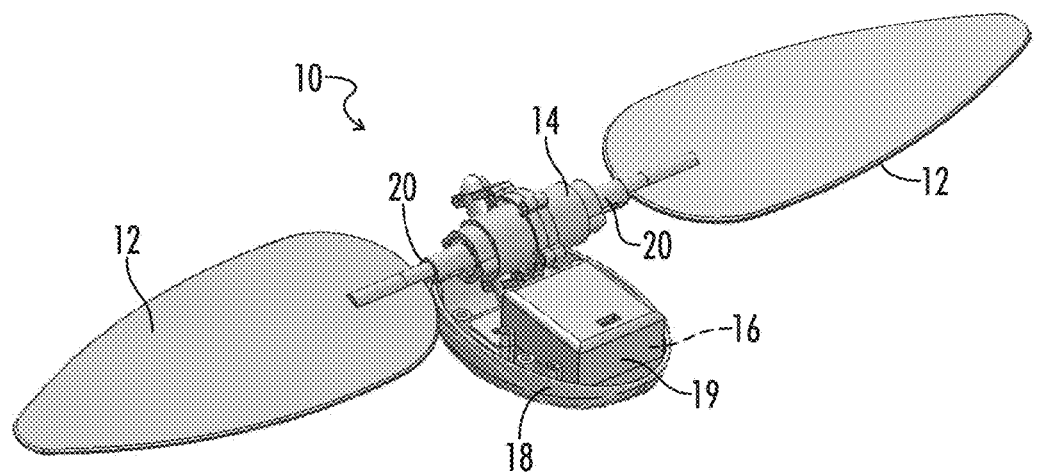
FIG. 1 is a top perspective view of a spinning wing decoy assembly with a first embodiment of a wing connector system of the present disclosure.

Referring to FIG. 1, a spinning wing decoy assembly 10 is shown with wing members 12 attached to motor 14 using wing connector system 20. In the assembly, spinning motion of wing members 12 is actuated using motor 14 or other actuation component. Motor 14 is a single motor in some instances, or multiple motors in other instances. For example, each wing member 12 may be driven by a separate motor 14. In some instances, motor 14 is an electrical motor. The power to drive motor 14 is provided by a power source 16, which may be a battery, a rechargeable battery, or any other power source capable of supplying power to rotate wing members 12. Power source 16 and/or motor 14 are housed in a waterproof housing to avoid exposure to weather conditions or bodies of water where spinning wing decoy assembly 10 may be positioned. Power source 16 and motor 14 are attached to housing body 18 using one or more fasteners, which include screws, bolts, brackets, slots and tabs, straps, or other known fastening means. A housing cover 19 is used in some embodiments to further seal power source 16 and/or motor 14 from wet conditions. In this configuration, motor 14 and wing members 12 are surrounded and enclosed by the outer decoy body. While the decoy body is not shown, it is to be understood that the body is designed to resemble a target animal with wings, such as a waterfowl. However, other decoy bodies are compatible with the present disclosure such that they are positioned about spinning wing decoy assembly 10.

Figure 2:
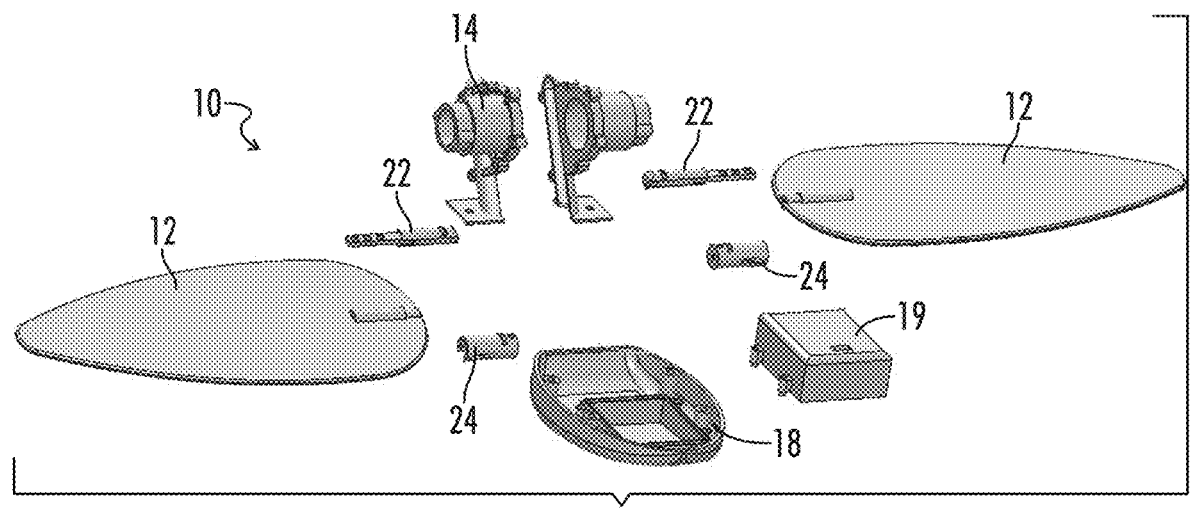
FIG. 2 is an exploded top perspective view of the spinning wing decoy assembly of FIG. 1, with the first embodiment of the wing connector system of the present disclosure disassembled.

Referring to FIG. 2, the components of spinning wing decoy assembly 10 are shown disassembled. Wing connector system 20 is shown in its components, including wing adapter 22, motor shaft adapter 24, and barrel nut 26[1]. Each wing member 12 is configured to be attached to motor 14 using a wing connector system 20. Each wing adapter 22 attaches to one wing member 12, while each motor shaft adapter 24 attaches to motor 14. When multiple motors are utilized, each motor shaft adapter 24 is configured to attach to each motor 14. Barrel nut 26 fastens each wing adapter 22 to each motor shaft adapter 24, as is described herein in greater detail.

[1] Not shown in FIG. 2 as currently depicted. but will be added in the formal drawings.

Figure 3:
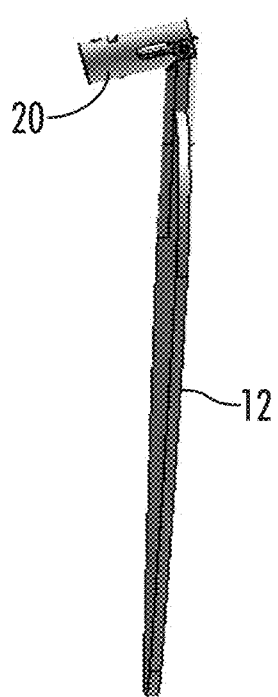
FIG. 3 is a side perspective view of wing actuation components of the spinning wing decoy assembly of FIG. 1.

In FIG. 3, a wing member 12 is shown as separated from spinning wing decoy assembly 10. The shape of wing member 12 is such that wings resemble the wings of the target animal. Wing member 12 is connected to wing connector system 20, which is depicted in a folding position, allowing the angle of wing member 12 to be adjusted more than 90 degrees relative to a longitudinal axis 46 of motor shaft adapter 24 and a motor shaft. The folding ability of wing member 12 allows for the transport and storage of spinning wing decoy assembly 10 without the removal of wing member 12 from motor 14.

Figure 4:
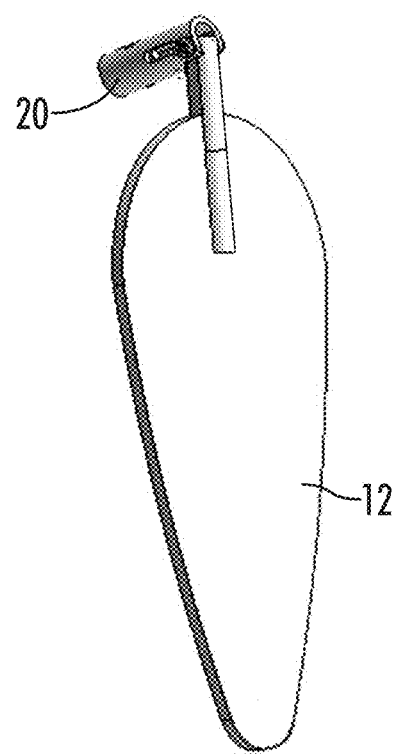
FIG. 4 is a front perspective view of wing actuation components of the spinning wing decoy assembly of FIG. 1.

Similarly, in FIG. 4, wing member 12 is shown in a bent or folded position due to the folding capability of wing connector system 20. Folding allows wing members 12 to be quickly moved from an operating position to a folded, storage position. In such a storage position, wing members 12 are secure so that damage during transport or storage is reduced or eliminated. Further, the ability to quickly fold wing members 12 allows for relatively fast and easy relocation of spinning wing decoy system 10 when a user desires to change its location to attract game to a new location. Upon placement in a first or new location, wing members 12 are configured to be unfolded to the operating position with wing members 12 extended. Motion of wing spinning resembles the motion of the target animal, such that spinning wing decoy assembly 10 attracts target game.

Figure 5:
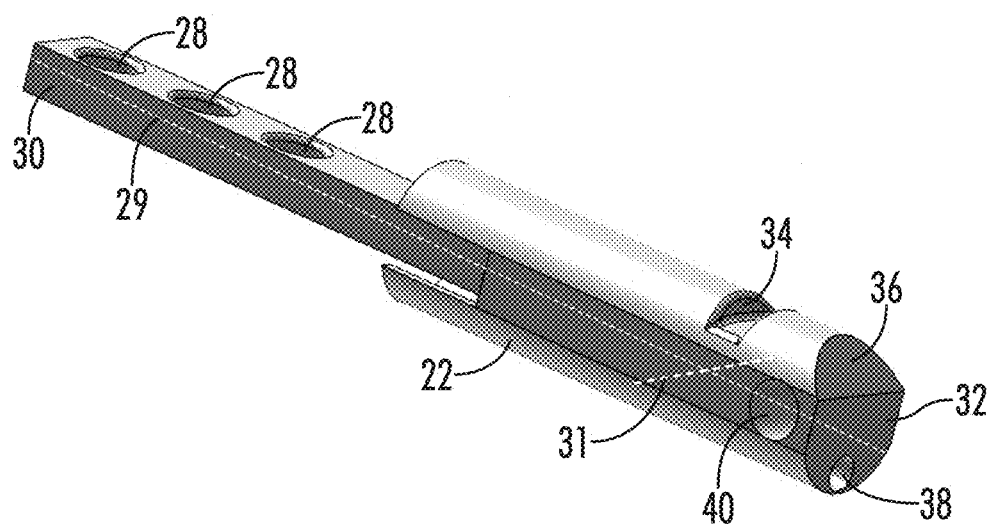
FIG. 5 is a side perspective view of a wing adapter of the first embodiment of the wing connector system of the present disclosure.

Referring now to FIG. 5, wing adapter 22 of the first embodiment of wing connector system 20 is depicted in greater detail. Wing adapter 22 has a first end 30 and a second end 32, with features for connection to wing members 12 near first end 30 and features for connection to motor shaft adapter 24 near second end 32. Further, wing adapter 22 includes a longitudinal axis 29 spanning the length of wing adapter 22 and a lateral axis 31 spanning the width of wing adapter 22. Near first end 30 and extending tangential to both lateral axis 31 and longitudinal axis 29 are several wing reception holes 28 for attaching wing adapter 22 to wing members 12. In the depicted embodiment, three holes 28 are shown, though more or less holes are contemplated provided that they attach to wing member 12. Holes 28 allow wing adapter 22 to be inserted and attached to wing member 12 during wing member production and provides a strong, irreversible connection to wing member 12. Attachment is undertaken using attachment means known in the art, including insertion of corresponding features into holes 28, bonding wing adapter 22 to wing member 12, or other attachment means.

Moving from holes 28 toward second end 32, wing adapter 22 has a cross section that corresponds to the cross section of the hollow interior of motor shaft adapter 24, such that second end 32 is configured to be inserted and fit within the hollow interior of motor shaft adapter 24. In the depicted embodiment, the cross sections are approximately circular, though other complementary cross sections are possible. At least one edge of second end 32 includes a chamfer 36 that provides clearance for the folding of wing connector system 20 when wing adapter 22 is inserted and bolted into motor shaft adapter 24. Also along the circular cross sectioned section of wing adapter 22 is a groove cut 34, which allows wing adapter 22 and attached wing member 12 to fold up to or greater than 90 degrees relative to the longitudinal axis 46 of motor shaft adapter 24. Groove cut 34 is depicted to be approximately rectangular, though other shapes of grooves are compatible with the present disclosure. In the depicted embodiment, groove cut 34 includes a length approximately parallel to lateral axis 31 and a width approximately parallel to longitudinal axis 29.

Wing adapter 22 further includes a magnet reception hole 38 for the placement of a ferrous metal for a magnetic hold while wing connector system 20 is in an operating position. Hole 38 is located at second end 32, and extends approximately in the direction of longitudinal axis 29. The cross section and depth of hole 38 are such that the ferrous metal fits within while wing connector system 20 is in operating position. While the cross section depicted in the example in FIG. 5 is circular, other hole cross sections are possible. Additionally, wing adapter 22 includes a barrel nut hole 40 for the reception of barrel nut 26. Barrel nut hole 40 has a cross section complementary to that of barrel nut 26 and a diameter at least slightly greater than the diameter of barrel nut 26. Barrel nut hole 40 extends through wing adapter 22 in the direction of lateral axis 31.

Figure 6:
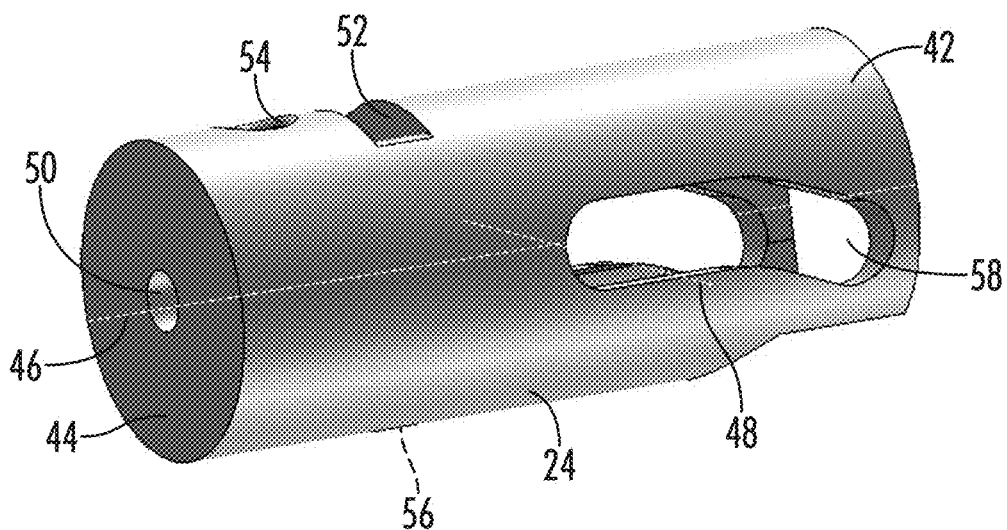
FIG. 6 is a side perspective view of a motor shaft adapter of the first embodiment of the wing connector system of FIG. 5.

In FIG. 6, motor shaft adapter 24 is shown with features depicted in detail. Motor shaft adapter 24 has a first end 42 for receiving wing adapter 22 and a second end 44 for attachment to motor 14. Further, motor shaft adapter 24 has longitudinal axis 46 along its length and lateral axis 48 along its width. The general cross section of motor shaft adapter 24 is approximately circular as depicted, though other cross sections are possible provided they are compatible with the reception of second end 32 of wing adapter 22. Motor shaft adapter 24 includes a hollow interior and an opening at first end 42 for the insertion and removal of wing adapter 22. The hollow interior extends longitudinally such that there is room for an inserted wing adapter 22 to slide within motor shaft adapter 24.

At second end 44 and extending in the direction of longitudinal axis 46 is a motor shaft reception hole 50, through which the motor shaft is placed. After placement of the motor shaft and powering of motor 14, motor shaft is positioned to rotate a connected wing member 12. Hole 50 has a cross section similar in size and shape to the motor shaft, such that insertion is enabled and snug. Additionally, a magnet slot 52 is provided near second end 44 for the insertion of a neodymium magnet. Magnet slot 52 is depicted in FIG. 6 as approximately rectangular, though other shapes are possible. The length of magnet slot 52 is approximately parallel to lateral axis 48, while the width of magnet slot 52 is approximately parallel to longitudinal axis 46. Opposite magnet slot 52 and extending approximately tangentially to both lateral axis 48 and longitudinal axis 46 is a magnet exit hole 56 for the removal of a magnet pressed through magnet slot 52. The dimensions and shape of magnet exit hole 56 are such that a magnet may be removed as desired, and hole 56 has different dimensions and shape in embodiments not depicted. Also near second end 44 is a motor shaft locking hole 54 for the reception of a set screw or other fastening means. When a fastener is inserted into hole 54 after the motor shaft is inserted into hole 50, the motor shaft is locked into place and attached to motor shaft adapter 24. Removal of the motor shaft from motor shaft adapter 24 is possible when the fastener is removed from hole 54.

Extending longitudinally from a position near first end 42 toward approximately the middle of motor shaft adapter 24 are two, opposing sliding grooves 58. The sliding grooves 58 are cut to allow sliding action of wing adapter 22 within motor shaft adapter 24. When wing adapter 22 is inserted within motor shaft adapter 24, barrel nut 26 extends through the first sliding groove 58, through barrel nut hole 40, and finally through the second sliding groove 58. The movement of barrel nut 26 along sliding grooves 58 permits folding movement of wing adapter 22 and, by extension, any attached wing member 12. Grooves 58 are approximately the same shape and are positioned opposite each other about the circumference of motor shaft adapter 24, such that an inserted barrel nut 26 follows the same path along each groove 58. The path of grooves 58 bends slightly as grooves 58 approach the middle of motor shaft adapter 24 so that an inserted wing adapter 22 is capable of bending or folding. The width of grooves 58 are such that barrel nut 26 fits and slides with relative ease within grooves 58. The extension of grooves 58 along the length of motor shaft adapter 24 is shown to approach approximately the middle of motor shaft adapter 24 in the depicted embodiment, though longer or shorter grooves 58 are compatible with the present disclosure.

Figure 7:
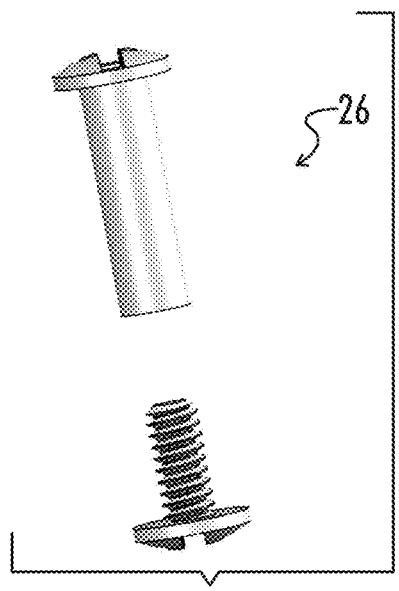
FIG. 7 is a side perspective view of a barrel nut of the first embodiment of the wing connector system of FIG. 5.

Now referring to FIG. 7, barrel nut 26 is depicted in detail. Barrel nut 26 includes an 18-8 stainless steel screw with 6-32 threads in the depicted example, though other screw sizes, materials, and threads are compatible with the present disclosure provided that barrel nut 26 is configured to be inserted through sliding grooves 58 and barrel nut hole 40.

Figure 8:
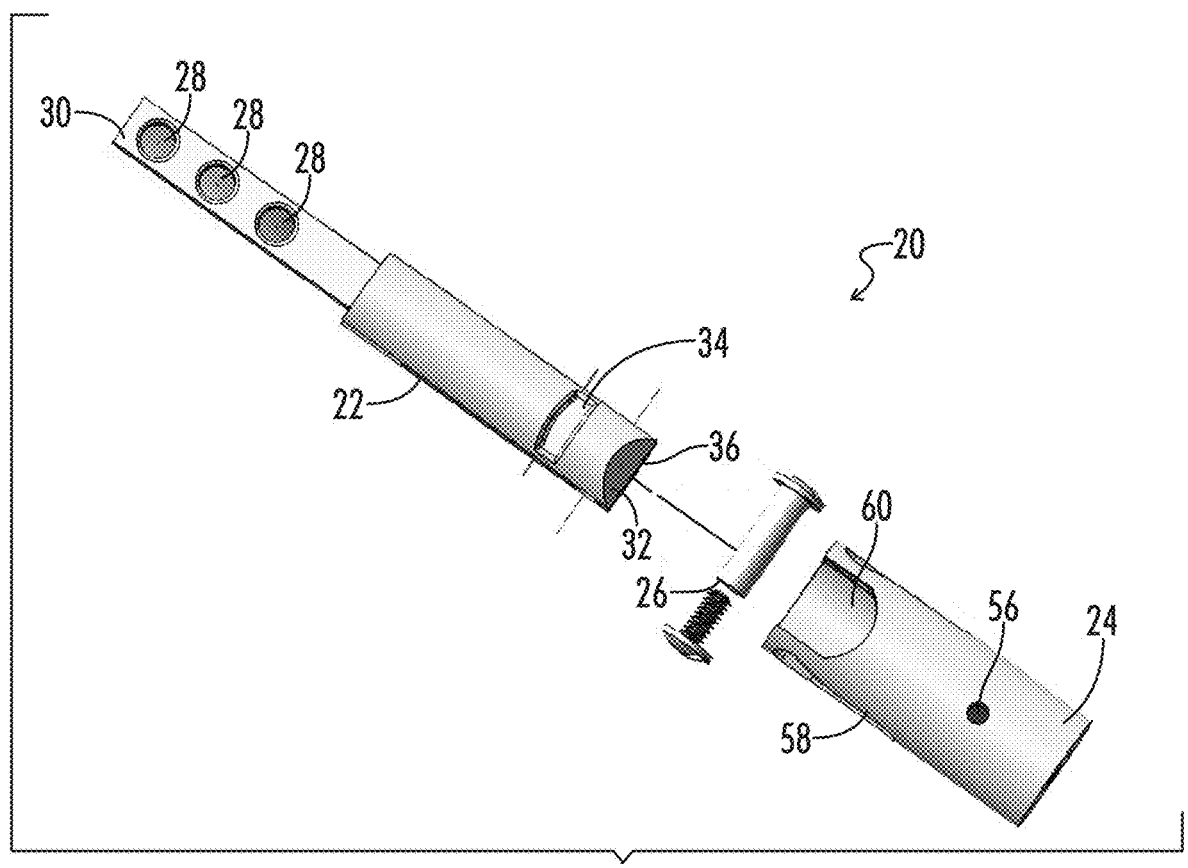
FIG. 8 is an exploded side perspective view of the wing adapter, motor shaft adapter, and barrel nut of the disassembled first embodiment wing connector system of FIG. 5.

FIG. 8 shows the disassembled components of wing connector system 20, including wing adapter 22, motor shaft adapter 24, and barrel nut 26. Second end 32 of wing adapter 22 is configured to be inserted through first end 42 of motor shaft adapter 24 into the hollow interior of motor shaft adapter 24. Barrel nut 26 is inserted through barrel nut hole 40 and sliding grooves 58 to lock wing adapter 22 within motor shaft adapter 24. For barrel nut 26 insertion, barrel nut hole 40 must be approximately aligned with sliding grooves 58. A folding cutout 60 extending longitudinally from first end 42 of motor shaft adapter 24 is provided to allow folding action of wing adapter 22 of more than 90 degrees, as desired, relative to longitudinal axis 46.

In FIG. 9, wing connector system 20 is depicted in an assembled, operating position. Wing adapter 22 is retracted, as shown by the location of barrel nut 26 at a point along grooves 58 closest to second end 44. In this position, wing adapter 22 and any attached wing member 12 does not bend relative to longitudinal axis 46, as second end 32 is stowed within motor shaft adapter 24.

In FIG. 10, however, wing connector system 20 is in an extended position, as shown by the location of barrel nut 26 along grooves 58. In the extended position, wing adapter 22 extends from the interior of motor shaft adapter 24, with second end 32 and chamfer 36 capable of clearing motor shaft adapter 24 through folding cutout 60. As wing adapter 22 extends, any attached wing member 12 likewise extends relative to motor 14 and housing body 18. In this position, wing adapter 22 and any attached wing member 12 is capable of folding relative to longitudinal axis 46, as second end 32 is configured to clear the walls of motor shaft adapter 24 in the extended position.

Figure 11:
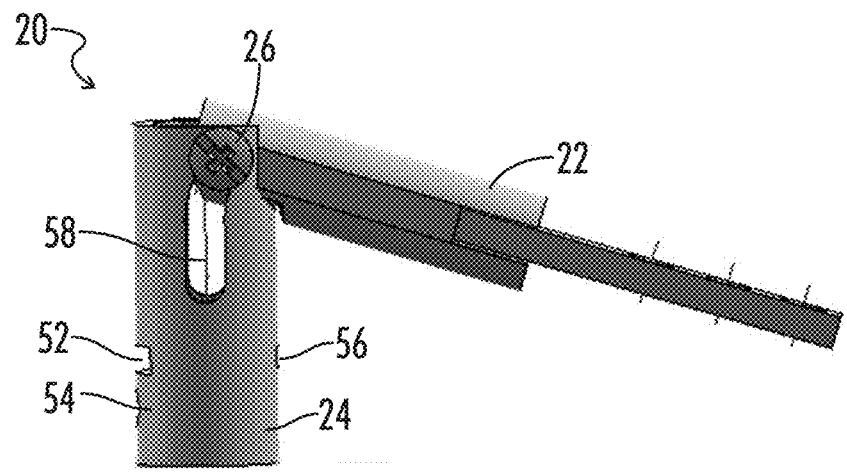
FIG. 11 is a side perspective view of the assembled first embodiment wing connector system of FIG. 5 in a folding position.

Now referring to FIG. 11, wing connector system 20 is shown in an extended and folded position. From the position in FIG. 10, wing adapter 22 is folded toward folding cutout 60, with wing adapter 22 clearing the sidewall of motor shaft adapter 24 at folding cutout 60. The folding allows wing adapter 22 to fold up to an angle of greater than 90 degrees relative to longitudinal axis 46. That is, longitudinal axis 29 of wing adapter 22, which is initially approximately co-linear with longitudinal axis 46 of motor shaft adapter 24, is capable of folding more than 90 degrees from its initial extended position. The folding occurs when wing adapter 22 pivots about barrel nut 26 when barrel nut 26 is positioned within grooves 58 at a location nearest first end 42. Folding cannot occur when barrel nut 26 is located along grooves 58 closer to second end 44, as wing adapter 22 cannot clear first end 42 and folding cutout 60 from these other groove locations of barrel nut 26.

Figure 12:
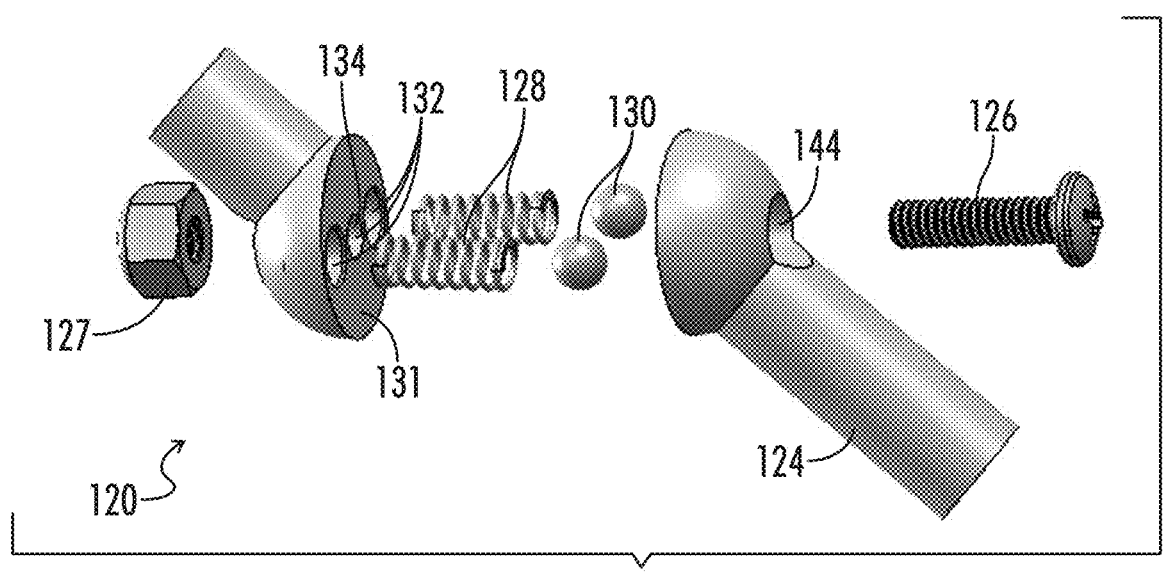
FIG. 12 is an exploded side perspective view of a wing adapter and motor shaft adapter of a disassembled second embodiment wing connector system of the present disclosure.

In FIG. 12, a second embodiment of the wing connector system 120 is depicted with components disassembled. Wing connector system 120 includes components with a circular face and uses springs and ball bearings for attachment and movement. A wing adapter 122 is coupled to a wing member 12 (not depicted), as well as a motor shaft adapter 124. Similarly, motor shaft adapter 124 is coupled to wing adapter 122 as well as the motor shaft. A screw 126 and locking nut 127 are used to fasten wing adapter 122 and motor shaft adapter 124 together, though other fastening means known in the art are compatible with the present disclosure. In the depicted embodiment, screw 126 is a ⅝ inch screw and locking nut 127 is a ⅝ inch nylon locking nut. When screws and locking nuts are utilized for fastening, they must be complementary to each other such that the screw threads and locks into the locking nut. Screw 126 or other fastening means fits through cutout 144 and bolt through holes 140, 134, while locking nut 127 or other fastening means fits within cutout 136 to lock screw 126 into position, thus coupling wing adapter 122 and motor shaft adapter 124.

Between a circular face 131 of wing adapter 122 and a circular face 138 of motor shaft adapter 124 are springs 128 and ball bearings 130. While two springs 128 and two ball bearings 130 are depicted, more or less of each component are compatible with the present disclosure. Springs 128 are 0.05 inch outer diameter and 0.016 inch inner diameter springs in the depicted embodiment, though other sizes are compatible with the present disclosure. Ball bearings 130 are 0.194 inch ball bearings in the depicted embodiment, though other sizes of ball bearings 130 are possible. Springs 128 rest within spring insets 132 on circular face 131 of wing adapter 122. The number of spring insets 132 matches the number of springs 128 and spring insets 132 are located to position springs 128 adjacent to an in communication with ball bearings 130. The location of ball bearings 130 is defined by ball bearing pockets 142 within circular face 138 of motor shaft adapter 124 (not shown in FIG. 12). The number of ball bearing pockets 142 matches the number of ball bearings 130. Ball bearing pockets 142 and spring insets 132 are approximately aligned when wing adapter 122 and motor shaft adapter 124 are assembled to form wing connector system 120.

Figure 13:
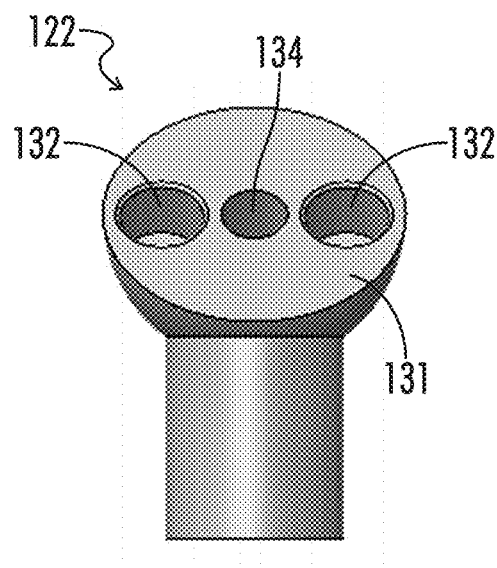
FIG. 13 is a front perspective view of the wing adapter of the second embodiment of the wing connector system of FIG. 12.

Now referring to FIG. 13, circular face 131 of wing adapter 122 is shown in greater detail. Bolt through hole 134 is located approximately at the center of circular face 131 and positioned to align with bolt through hole 140 of motor shaft adapter 124 when assembled as wing connector system 120. The diameter of bolt through hole 134 is approximately equal to that of bolt through hole 140 and is sized to accommodate screw 126 or other fastening means. Spring insets 132 are sized to accommodate springs 128 and may vary in diameter as the outer diameter of spring 128 increases or decreases. The locations of spring insets 132 about circular face 131 may be different from that which is depicted, though spring insets 132 should retain symmetrical positions about circular face 131.

Figure 14:
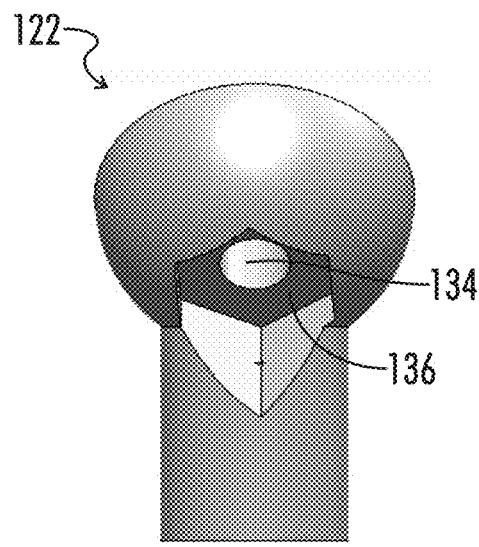
FIG. 14 is a back perspective view of the wing adapter of the second embodiment of the wing connector system of FIG. 12.

In FIG. 14, the reverse side of circular face 131 is shown, with bolt through hole 134 extending through circular face 131 and exiting at cutout 136. The shape of cutout 136 is such that locking nut 127 is accommodated and rests flush against wing adapter 122 when locked with screw 126. Sizes and shapes of cutout 136 may differ from that which is depicted when different locking nuts 127 or other fastening means are utilized.

Figure 15:
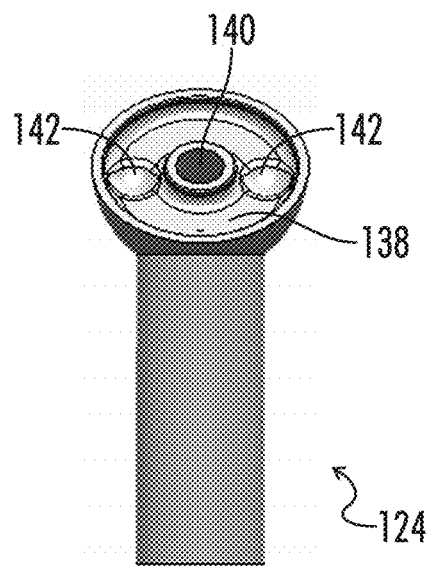
FIG. 15 is a back perspective view of the motor shaft adapter of the second embodiment of the wing connector system of FIG. 12.

In FIG. 15, circular face 138 of motor shaft adapter 124 is shown with features in greater detail. Bolt through hole 140 is located approximately at the center of circular face 130 and has a diameter approximately equal to that of bolt through hole 134. Further, bolt through hole 140 is sized to accommodate screw 126 or other fastening means. Also located about circular face 128 are two ball bearing pockets 142. The size of ball bearing pockets 142 is such that each ball bearing 130 fit within each pocket 142. The locations of ball bearing pockets 142 may differ from those depicted, but are symmetrically located about circular face 138. Ball bearing pockets 142 are configured to be approximately aligned with spring insets 132 when wing adapter 122 is coupled to motor shaft adapter 124.

Figure 16:
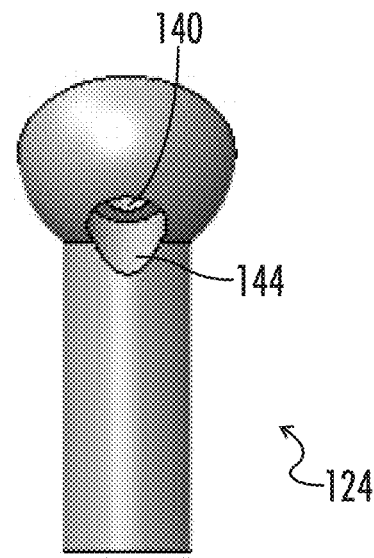
FIG. 16 is a front perspective view of the motor shaft adapter of the second embodiment of the wing connector system of FIG. 12.

Referring to FIG. 16, the opposite side of circular face 138 is shown, with bolt through hole 140 extending through circular face 138. Bolt through hole exits circular face at cutout 144, which is designed to accommodate a head of screw 126 or other fastener and hold it flush against motor shaft adapter 124.

Figure 17:
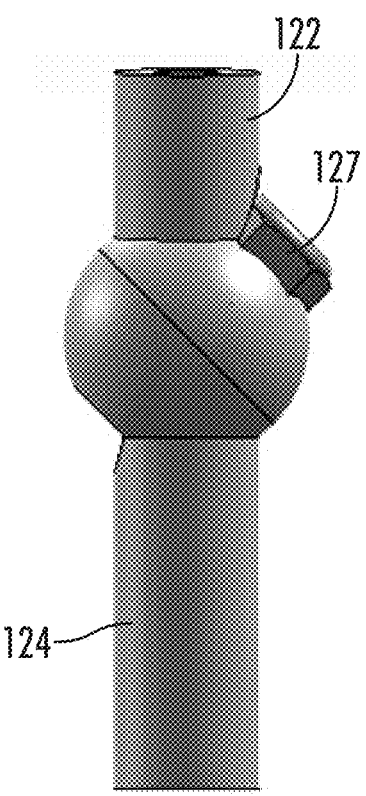
FIG. 17 is a side elevation view of the assembled second embodiment wing connector system of FIG. 12 in a straight configuration.

Now referring to FIG. 17, the assembled wing connector system 120 is depicted in a straight, extended configuration. In this position, wing adapter 122 is connected to a wing member 12 and motor shaft adapter 124 is connected to the motor shaft. Screw 126 is inserted through bolt through hole 140, exits through bolt through hole 134, and is locked by locking nut 127 to hold wing adapter 122 in position with motor shaft adapter 124.

Figure 18:
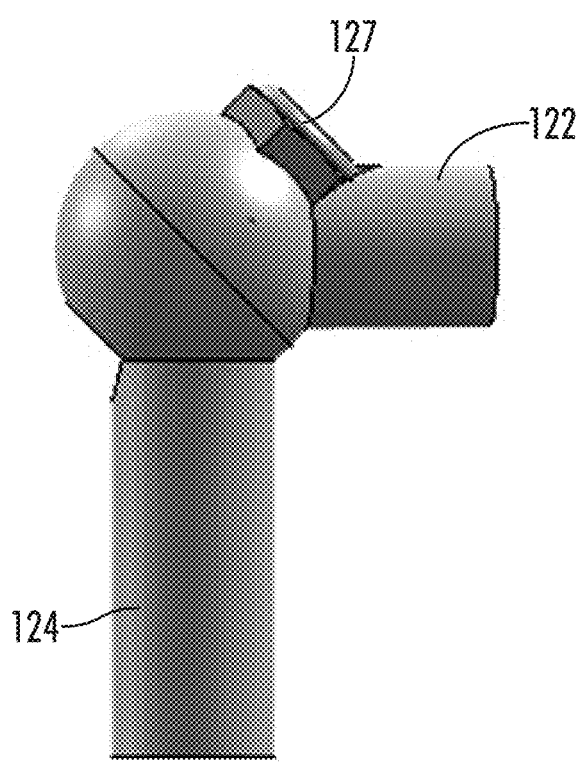
FIG. 18 is a side elevation view of the assembled second embodiment wing connector system of FIG. 12 in a bent configuration.

In FIG. 18, wing connector system 120 is shown in a folded configuration. This configuration includes either wing adapter 122 or motor shaft adapter 124 rotated approximately 180 degrees about its circular face 131 or 138, respectively. In one embodiment, wing adapter 122 is rotated relative to the straight, extended configuration, allowing an attached wing member 12 (not depicted) to be positioned at a different angle relative to housing body 18 and motor 14. From the folded configuration, wing members 12 are similarly folded, allowing the transport or storage of spinning wing decoy system 10. Due to the locations of spring insets 132 and ball bearing pockets 142, either wing adapter 122 or motor shaft adapter 124 may be rotated and repositioned only into the extended or folded position, and not into any intermediate position where springs 128 or ball bearings 130 do not align with spring insets 132 or ball bearing pockets 142, respectively.

Figure 19:
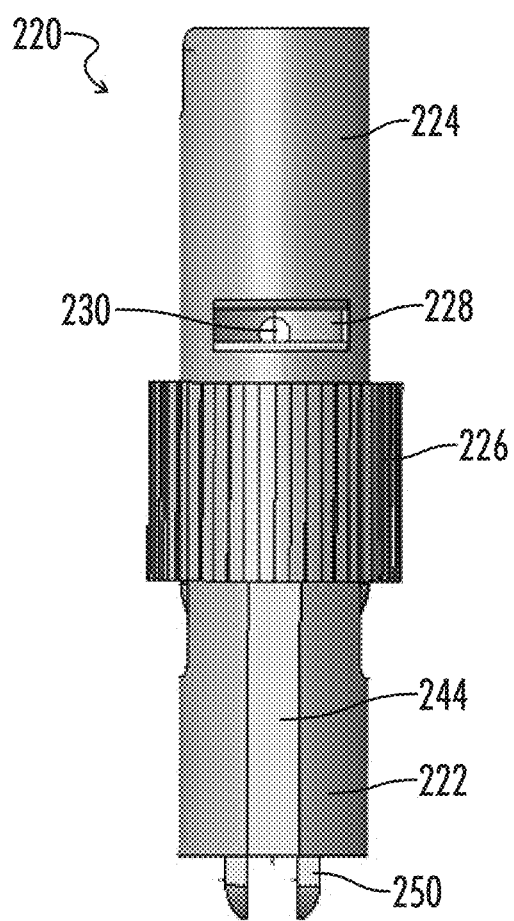
FIG. 19 is a top elevation view of an assembled third embodiment wing connector system of the present disclosure.

Now referring to FIG. 19, there is depicted a third embodiment of the wing connector system 220 having a slide locking feature for fastening the wing mount adapter 222 and the motor mount adapter 224. In this embodiment, wing mount adapter 222 includes extruded spikes 250 for wing stability and a slide groove 244 as a path for slide lock 226. The function of slide lock 226 is to securely attach wing mount adapter 222 and any attached wing member 12 (not depicted) to motor mount adapter 224 and an attached motor. Motor mount adapter 224 further includes features such as a magnet slot 228 and a magnet exit hole 230, which are described in greater detail below.

Figure 20:
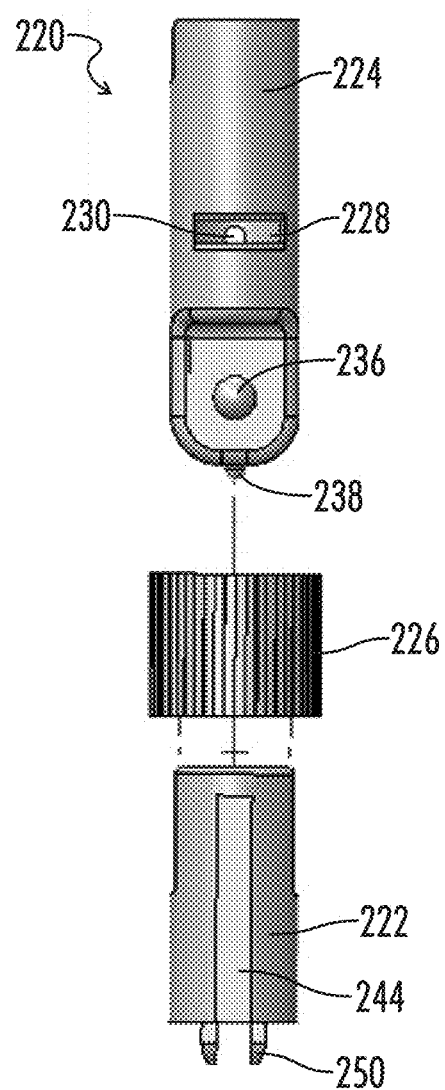
FIG. 20 is an exploded top elevation view of a motor mount adapter, a wing mount adapter, and a slide lock of a disassembled third embodiment of the wing connector system of FIG. 19.

In FIG. 20, a disassembled view of wing connector system 220 is shown, with wing mount adapter 222, motor mount adapter 224, and sliding lock 226 uncoupled. Motor mount adapter 224 fits within a hollow interior of wing mount adapter 222 and has at least one pivot ball extrusion 236 that is configured to rest within a ball extrusion cutout 246 of wing mount adapter 222. Further, motor mount adapter 224 includes a lock ball extrusion 238 that functions as a locking point or hard stop point when resting in the hollow interior of wing mount adapter 222. Slide lock 226 is slotted along slide groove or grooves 244 to lock motor mount adapter 224 inside wing mount adapter 222.

Figure 21:
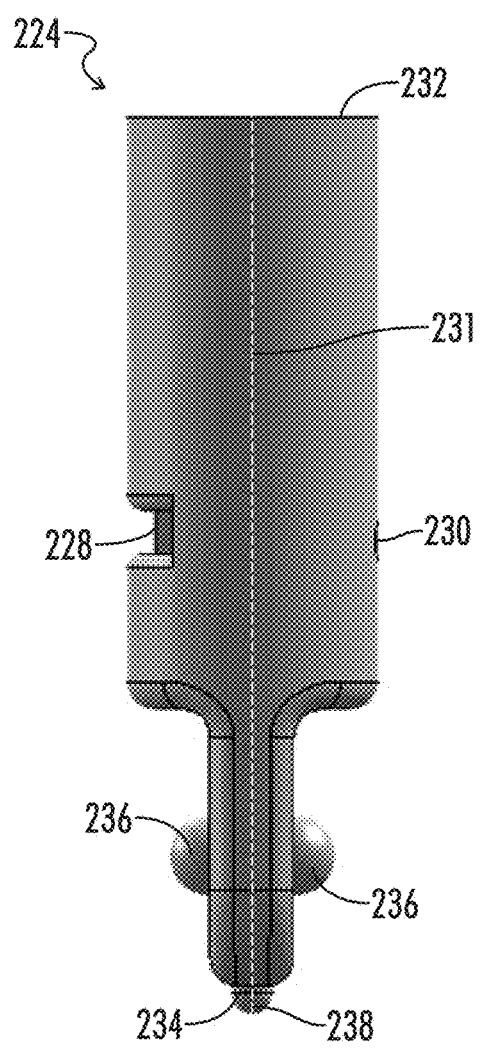
FIG. 21 is a side elevation view of the motor mount adapter of the third embodiment of the wing connector system of FIG. 19.

FIG. 21 shows motor mount adapter 224 in greater detail, with features visible. Motor mount adapter 224 has a first end 232, a second end 234, and a longitudinal axis 231, with a section closest to first end 232 having an approximately circular cross section. A motor may be attached at first end 232, while motor mount adapter second end 234 is configured to be inserted into a second end 242 of wing mount adapter 222. Lock ball extrusion 238 is located at second end 234 and is of a size and shape complementary to a receptacle within the hollow interior of wing mount adapter 222 (not shown). Lock ball extrusion 238 serves as a stopping point or locking point when motor mount adapter 224 is inserted into wing mount adapter 222. Also on motor mount adapter 224 is at least one pivot ball extrusion 236 for resting within a ball extrusion cutout 246 of wing mount adapter 222 and for rotatably positioning motor mount adapter 224 within wing mount adapter 222. In the depicted embodiment, two pivot ball extrusions 236 are depicted, though more or less are compatible with the present disclosure. The size and shape of pivot ball extrusions 236 are such that they are complementary to ball extrusion cutouts 246. Further, pivot ball extrusions 236 are positioned to align with ball extrusion cutouts 246 when motor mount adapter 224 is placed within the hollow interior of wing mount adapter 222. Pivot ball extrusions 236 extend tangential to longitudinal axis 231 and are symmetrically located about longitudinal axis 231. Further, pivot ball extrusions 236 serve as pivot points so that motor mount adapter 224 and wing mount adapter 222 may be positioned at an angle to each other, as is described below.

Located closer to first end 232 than pivot ball extrusions 236 is a magnet slot 228 and magnet exit hole 230. Magnet slot 228 is depicted to be approximately rectangular, though other shapes are possible such that a magnet may be inserted there through. The length of magnet slot 228 is approximately tangential to longitudinal axis 231, while the width of magnet slot is approximately parallel to longitudinal axis 231. Magnet exit hole 230 is located approximately opposite magnet slot 228 about the circumference of motor mount adapter 224 and is positioned to receive a magnet exiting motor mount adapter 224. The size of magnet exit hole 230 is such that a magnet may be pulled through it for magnet removal.

Figure 22:
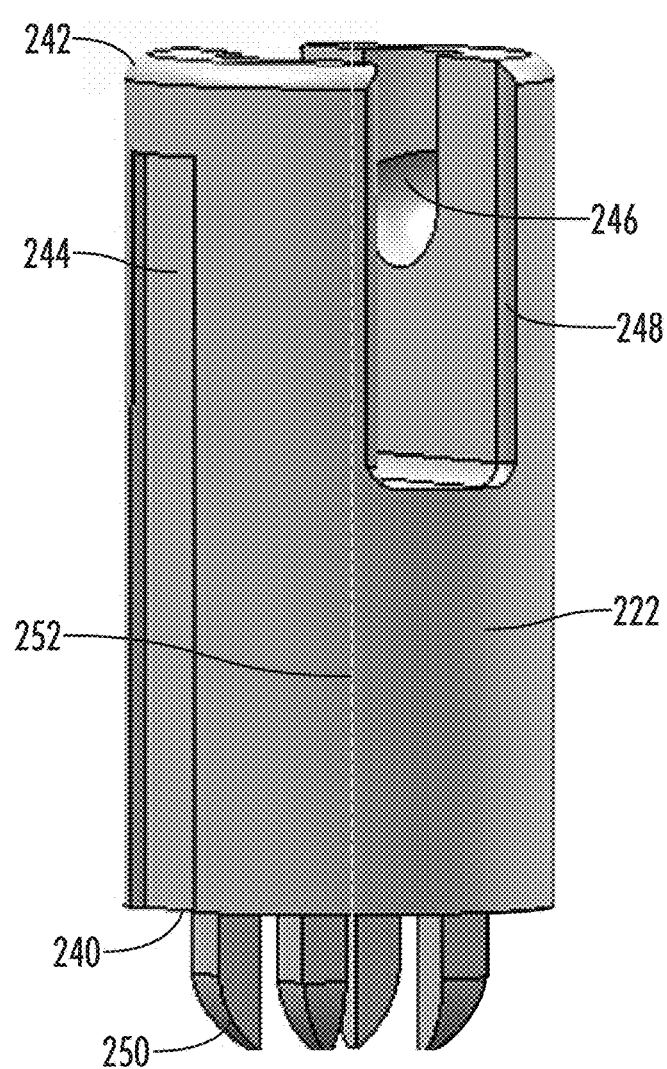
FIG. 22 is a side perspective view of the wing mount adapter of the third embodiment of the wing connector system of FIG. 19.

In FIG. 22, the wing mount adapter 22 is shown in detail. Wing mount adapter 222 includes extruded spikes 250 for wing stability at its first end 240. While four spikes 250 are depicted, more or less spikes 250 are contemplated in the present disclosure for the purpose of wing stability. Extruded spikes 250 extend from first end 240 in a direction parallel to the longitudinal axis 252 of wing mount adapter 222. The length and shape of extruded spikes 250 may vary in embodiments not shown.

At second end 242, ball extrusion cutout 246 is shown, with a second cutout 246 circumferentially opposite but not visible. The number and shape of cutouts 246 is complementary to the number and shape of pivot ball extrusions 236, such that each pivot ball extrusion 236 is configured to be aligned with and rest within each cutout 246. When wing mount adapter 222 or motor mount adapter 224 is rotated about pivot ball extrusions 236, rotation is permitted due to the clearance provided by locking cutouts 248. Thus, when wing mount adapter 22 is rotated about pivot ball extrusions 236, second end 234 slots within locking cutouts 248 to enable the rotation. The location of locking cutouts 248 is extending from second end 242 toward approximately a middle point of the length of wing mount adapter 222. The width of cutouts 248 is such that second end 234 fits within each when rotation occurs. Locking cutouts 248 are located opposite each other circumferentially about wing mount adapter 222 to permit rotation. Further, locking cutouts 248 allow lock ball extrusion 238 to be locked into place when deployed.

Additionally, wing mount adapter 222 includes at least one slide groove 244 for the positioning of slide lock 226. Slide grooves 244 are located approximately circumferentially opposite each other about wing mount adapter 222 and extend from first end 240 toward nearly second end 242. The depth and width of grooves 244 is such that groove extrusions 256 within slide lock 226 snuggly slide within the groove path. While two grooves 244 are depicted in the present embodiment, other embodiments may include more or less grooves 244 such that the number and position of grooves 244 is complementary to the number and position of groove extrusions 256.

Figure 23:
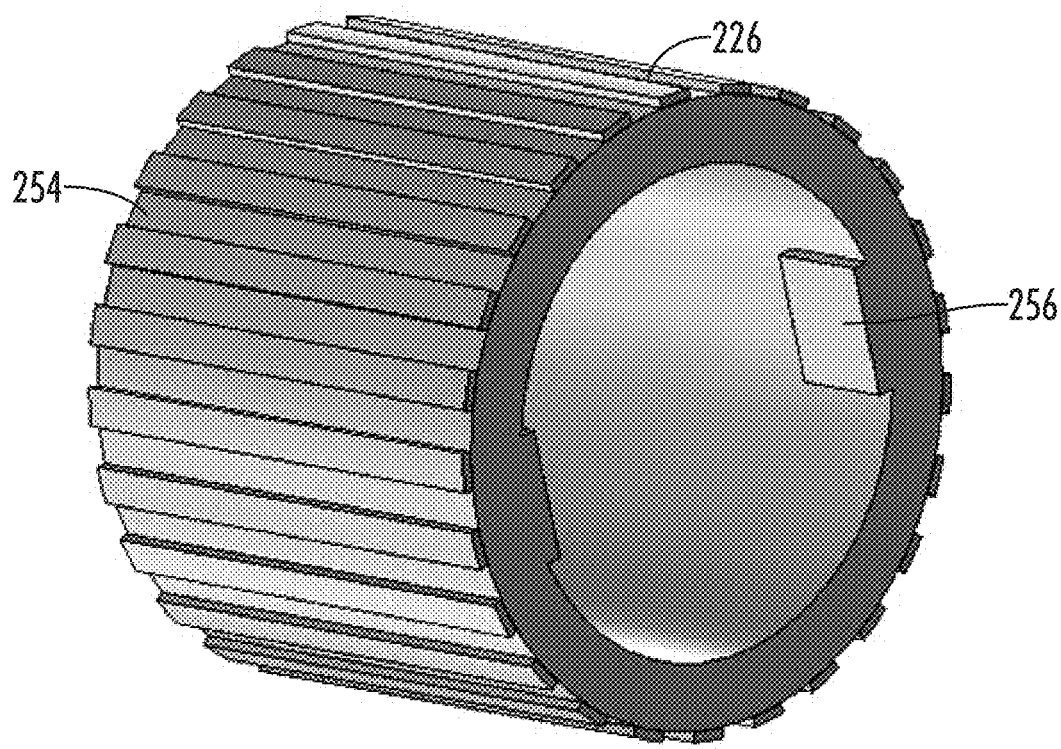
FIG. 23 is a side perspective view of the slide lock of the third embodiment of the wing connector system of FIG. 19.

Referring now to FIG. 23, slide lock 226 is shown with features in greater detail. Slide lock 226 has a substantially circular cross section that has an inner diameter that is slightly larger than the outer diameter of wing mount adapter 222, allowing slide lock 226 to slide over wing mount adapter 222. Within the interior of slide lock 226 are groove extrusions 256, the number and size of which match the number and size of grooves 244. Similarly, the circumferential positioning of groove extrusions 256 matches the circumferential positioning of grooves 244. Two groove extrusions 256 are shown in the depicted embodiment, though more or less groove extrusions 256 are possible.

About the outer face of slide lock 226 are multiple gripping slots 254 that aid in the gripping and rotation of slide lock 226. The number, spacing, and depth of gripping slots 254 is variable such that gripping of the user is aided. When slide lock is moved from first side 240 towards second side 242 while motor mount adapter 224 is inserted within wing mount adapter 222, slide lock 226 locks the connected motor mount adapter 224 and wing mount adapter 222 into place. Rotation or folding is not possible when slide lock 226 is at the second end position of sliding grooves 244. Similarly, movement of slide lock 226 towards first end 240 or off of wing mount adapter 222 entirely allows the rotation of wing mount adapter 222 relative to motor mount adapter 224, or the rotation of motor mount adapter 224 relative to wing mount adapter 222.

Figure 24:
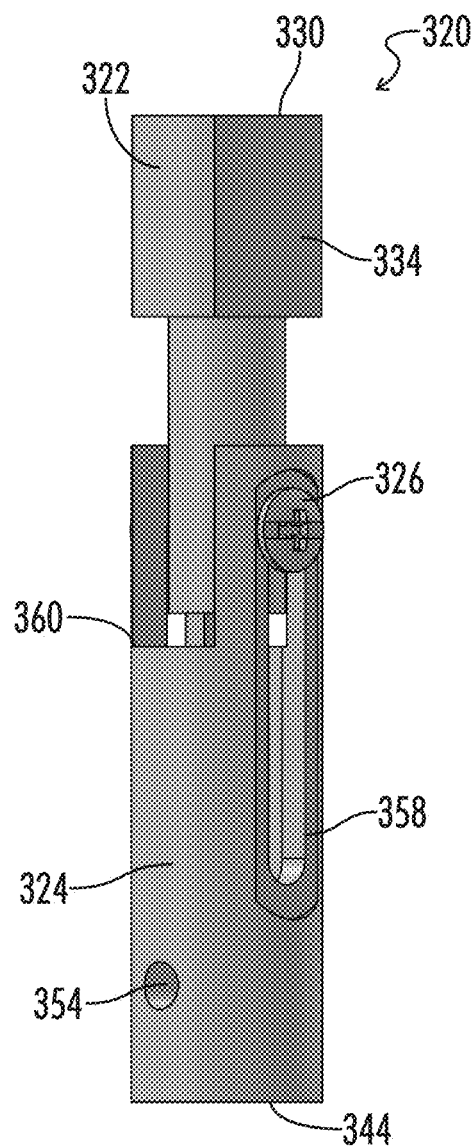
FIG. 24 is a side perspective view of an assembled fourth embodiment wing connector system of the present disclosure.

Referring now to FIG. 24, a fourth embodiment wing connector system 320 is shown, with wing adapter 322 and motor shaft adapter 324 coupled. Each wing member 12 is configured to be attached to motor 14 using a wing connector system 320. Each wing adapter 322 attaches to one wing member 12, while each motor shaft adapter 324 attaches to motor 14. When multiple motors are utilized, each motor shaft adapter 324 is configured to attach to each motor 14. Fastener 326 fastens each wing adapter 322 to each motor shaft adapter 324, as is described herein in greater detail.

In FIG. 25A, motor shaft adapter 324 is shown with features depicted in detail. Motor shaft adapter 324 has a first end 342 for receiving wing adapter 322 and a second end 344 for attachment to motor 14. Further, motor shaft adapter 324 has longitudinal axis 346 along its length. The general cross section of motor shaft adapter 324 in the plane perpendicular to longitudinal axis 346 is approximately circular as depicted below a folding cutout 360, though other cross sections are possible provided they are compatible with the reception of second end 332 of wing adapter 322. Motor shaft adapter 324 includes a hollow interior and an opening at first end 342 for the insertion and removal of wing adapter 322. The hollow interior extends longitudinally such that there is room for an inserted wing adapter 322 to slide within motor shaft adapter 324.

As shown in FIG. 25B, at second end 344 and extending in the direction of longitudinal axis 346 is a motor shaft reception hole 350, through which the motor shaft is placed. After placement of the motor shaft and powering of motor 14, the motor shaft is positioned to rotate a connected wing member 12. Hole 350 has a cross section similar in size and shape to the motor shaft, such that insertion is enabled and snug. Also near second end 344 is a motor shaft locking hole 354 for the reception of a set screw or other fastening means. When a fastener is inserted into hole 354 after the motor shaft is inserted into hole 350, the motor shaft is locked into place and attached to motor shaft adapter 324. Removal of the motor shaft from motor shaft adapter 324 is possible when the fastener is removed from hole 354.

Extending longitudinally from a position near first end 342 for approximately ⅔ the length of motor shaft adapter 324 are two, opposing sliding grooves 358. The sliding grooves 358 are cut to allow sliding action of wing adapter 322 within motor shaft adapter 324. When wing adapter 322 is inserted within motor shaft adapter 324, fastener 326 extends through the first sliding groove 358, through fastener hole 340, and finally through the second sliding groove 358. The movement of fastener 326 along sliding grooves 358 permits folding movement of wing adapter 322 and, by extension, any attached wing member 12. Grooves 358 are approximately the same shape and are positioned opposite each other about the circumference of motor shaft adapter 324, such that an inserted fastener 326 follows the same path along each groove 358. The path of grooves 358 is approximately linear, allowing an inserted wing adapter 322 to bend or fold while navigating the path. The width of grooves 358 are such that fastener 326 fits and slides with relative ease within grooves 358. The extension of grooves 358 along the length of motor shaft adapter 324 is shown to approach approximately ⅔ of the length of motor shaft adapter 324 in the depicted embodiment, though longer or shorter grooves 358 are compatible with the present disclosure.

Additionally, extending longitudinally from a position near first end 342 for approximately ⅓ the length of motor shaft adapter 324 are two, opposing folding cutouts 360. Folding cutouts 360 are positioned approximately 180° from each other about the circumference of motor shaft adapter 324, and are offset approximately 90° from each sliding groove 358 about the circumference of motor shaft adapter 324. Each folding cutout 360 has approximately the same shape, which is depicted as a rectangular cutout. However, other shapes and sizes of folding cutouts 360 are possible, such that wing adapter 322 is configured to bend within motor shaft adapter 324 when received in an extended configuration with motor shaft adapter 324.

Referring now to FIG. 26A, wing adapter 322 of the first embodiment of wing connector system 320 is depicted in greater detail. Wing adapter 322 has a first end 330 and a second end 332, with features for connection to wing members 12 near first end 330 and features for connection to motor shaft adapter 324 near second end 332. Further, wing adapter 322 includes a longitudinal axis 329 spanning the length of wing adapter 322. As shown in FIG. 26B, near first end 330 and extending tangential to longitudinal axis 329 is at least one wing reception hole 328 for attaching wing adapter 322 to wing members 12. In the depicted embodiment, one hole 328 is shown, though more holes are contemplated provided that they attach to wing member 12. Hole 328 allows wing adapter 322 to be inserted and attached to wing member 12 during wing member production and provides a strong, irreversible connection to wing member 12. Attachment is undertaken using attachment means known in the art, including insertion of corresponding features into hole 328, bonding wing adapter 322 to wing member 12, or other attachment means.

Moving from hole 328 toward second end 332, wing adapter 322 has a cross section that corresponds to the cross section of the hollow interior of motor shaft adapter 324, such that second end 332 is configured to be inserted and fit within the hollow interior of motor shaft adapter 324. In the depicted embodiment, an extruded upper region 334 has a cross section that is complementary to and fits within folding cutout 360, though other complementary cross sections to folding cutout 360 are contemplated by the present disclosure. In the depicted embodiment, the lower region of wing adapter 322 has a cross section that is approximately circular, though other complementary cross sections are possible such that the lower portion of wing adapter 322 fits within the hollow interior of motor shaft adapter 324.

Additionally, wing adapter 322 includes a fastener hole 340 for the reception of fastener 326. Fastener hole 340 has a cross section complementary to that of fastener 326 and a diameter at least slightly greater than the diameter of fastener 326. Fastener hole 340 extends through wing adapter 322 in the direction perpendicular to longitudinal axis 329. Fastener 326 includes an 18-8 stainless steel screw with 6-32 threads in the depicted example, though other screw sizes, materials, and threads are compatible with the present disclosure provided that fastener 326 is configured to be inserted through sliding grooves 358 and fastener hole 340.

Figure 27:
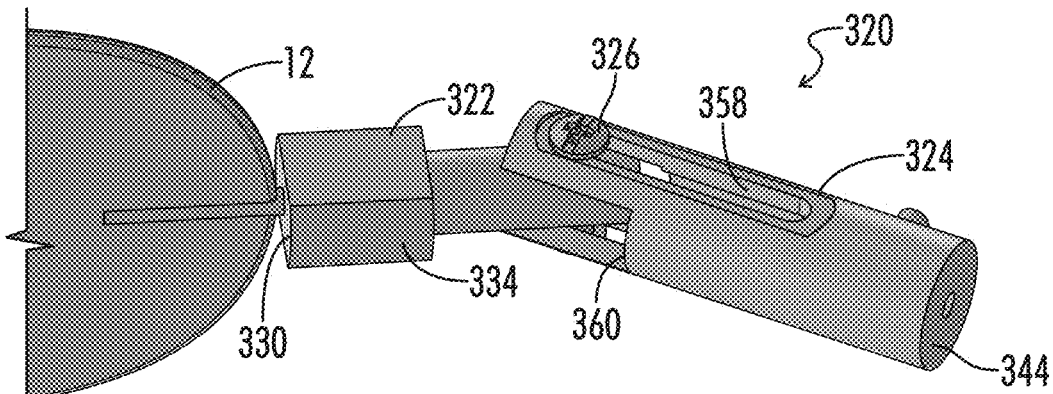
FIG. 27 is a side perspective view of the fourth embodiment wing connector system of FIG. 24 in a folded position.

Second end 332 of wing adapter 322 is configured to be inserted through first end 342 of motor shaft adapter 324 into the hollow interior of motor shaft adapter 324. Fastener 326 is inserted through fastener hole 340 and sliding grooves 358 to lock wing adapter 322 within motor shaft adapter 324. For fastener 326 insertion, fastener hole 340 must be approximately aligned with sliding grooves 358, as shown in FIG. 27. Folding cutouts 360 extending longitudinally from first end 342 of motor shaft adapter 324 are provided to allow folding action of wing adapter 322 of more than 90 degrees, as desired, relative to longitudinal axis 346.

In an extended position, the location of fastener 326 along grooves 358 is closest to first end 342 of motor shaft adapter 324. In the extended position, wing adapter 322 extends from the interior of motor shaft adapter 324, with second end 332 capable of clearing motor shaft adapter 324 through folding cutouts 360. As wing adapter 322 extends, any attached wing member 12 likewise extends relative to motor 14 and housing body 18. In this position, wing adapter 322 and any attached wing member 12 is capable of folding relative to longitudinal axis 346, as second end 332 is configured to clear the walls of motor shaft adapter 324 in the extended position.

In FIG. 27, wing connector system 320 is shown in an extended and folded position. From the extended position, wing adapter 322 is folded toward folding cutouts 360, with wing adapter 322 clearing the sidewall of motor shaft adapter 324 at folding cutouts 360. The folding allows wing adapter 322 to fold up to an angle of greater than 90 degrees relative to longitudinal axis 346. That is, longitudinal axis 329 of wing adapter 322, which is initially approximately co-linear with longitudinal axis 346 of motor shaft adapter 324, is capable of folding more than 90 degrees from its initial extended position. The folding occurs when wing adapter 322 pivots about fastener 326 when fastener 326 is positioned within grooves 358 at a location nearest first end 342. Folding cannot occur when fastener 326 is located along grooves 358 closer to second end 344, as wing adapter 322 cannot clear first end 342 and folding cutouts 360 from these other groove locations of fastener 326.

In FIG. 27, wing member 12 is connected to wing connector system 320, which allows the angle of wing member 12 to be adjusted more than 90 degrees relative to a longitudinal axis 346 of motor shaft adapter 324. The folding ability of wing member 12 allows for the transport and storage of spinning wing decoy assembly 10 without the removal of wing member 12 from motor 14. Wing member 12 is shown in a bent or folded position due to the folding capability of wing connector system 320. Folding allows wing members 12 to be quickly moved from an operating position to a folded, storage position. In such a storage position, wing members 12 are secure so that damage during transport or storage is reduced or eliminated. Further, the ability to quickly fold wing members 12 allows for relatively fast and easy relocation of spinning wing decoy system 10 when a user desires to change its location to attract game to a new location. Upon placement in a first or new location, wing members 12 are configured to be unfolded to the operating position with wing members 12 extended. Motion of wing spinning resembles the motion of the target animal, such that spinning wing decoy assembly 10 attracts target game.

Figure 28:
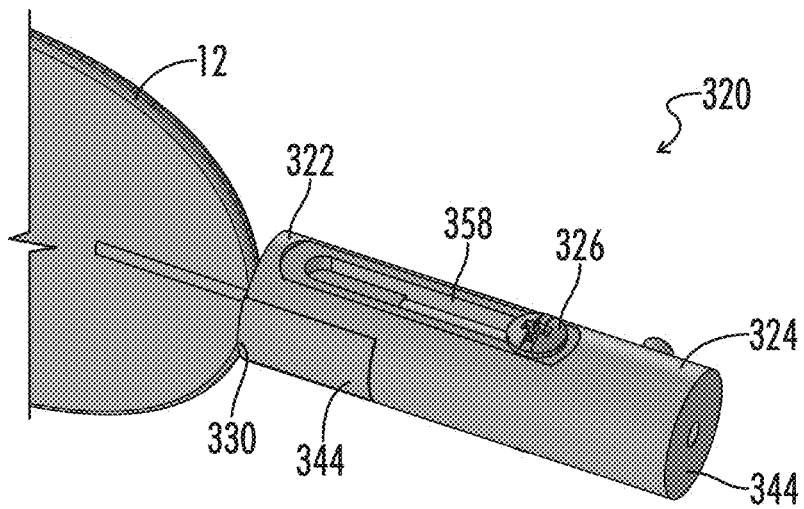
FIG. 28 is a side perspective view of the fourth embodiment wing connector system of FIG. 24 in an operating position.

In FIG. 28, wing connector system 320 is depicted in an assembled, operating position. Wing adapter 322 is retracted, as shown by the location of fastener 326 at a point along grooves 358 closest to second end 344. In this position, wing adapter 322 and any attached wing member 12 does not bend relative to longitudinal axis 346, as second end 332 is stowed within motor shaft adapter 324. In the operating position, extruded upper region 334 of wing adapter 322 rest snuggly within each folding cutout 360 of motor shaft adapter 324.

Figure 29:
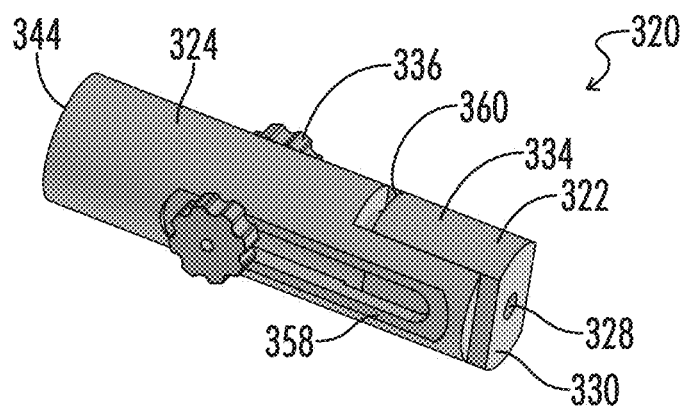
FIG. 29 is a side perspective view of the fourth embodiment wing connector system of FIG. 24 in an operating position with a locking knob.

Now referring to FIG. 29, wing connector system 320 optionally includes a locking knob 336 in the place of fastener 326. Locking knob 336 is configured to fit within fastener hole 340 and sliding grooves 358, as described above for fastener 326. Locking knob 336 has an additional locking function for allowing a user to lock wing connector system 320 into an operating, extended, or folded position. For operation of locking knob 336, the user twists locking knob 336 in a first direction for tightening, which causes wing adapter 322 to be held in the desired location within motor shaft adapter 324. When the desired location is close to second end 334 of motor shaft adapter 324, wing adapter 322 is unable to rotate and is thus locked in the operating position. When the desired location is close to first end 342 of motor shaft adapter 324, wing adapter 322 is extended. If locked when extended and with longitudinal axis 329 of wing adapter 322 approximately co-linear with longitudinal axis 346 of motor shaft adapter 324, locking knob 336 places wing connector system 320 in an extended position. If locked when extended and with longitudinal axis 329 of wing adapter 322 at an angle greater than 0° and up to 180° relative to longitudinal axis 346 of motor shaft adapter 324, locking knob 336 places wing connector system 320 in an extended and folded position. For loosening locking knob 336, the user twists locking knob 336 in a second direction, which allow wing adapter 322 to move within and/or rotate relative to motor shaft adapter 324.

As will be understood by those familiar with the art, the present invention may be embodied in other specific forms without departing from the spirit or essential characteristics thereof. For example, it is contemplated that the orientation of the connecter system can be essentially reversed so that the motor adapter is slidably received within the wing adapter Accordingly, the disclosures and descriptions herein are intended to be illustrative, but not limiting, of the scope of the invention which is set forth in the following claims.

We claim:

1. A method of transporting a winged decoy without detaching wing members, the method comprising the steps of:

a) providing the winged decoy including at least one wing member connected to a motor shaft within the winged decoy through a wing connector system, the wing connector system having:
  at least one wing adapter for attachment to the wing member, each wing adapter including a wing adapter first end coupled to the wing member, a wing adapter second end, and a wing adapter longitudinal axis spanning a length of the wing adapter,
  at least one motor shaft adapter for attachment to the motor shaft, each motor shaft adapter including a motor shaft adapter first end receiving the wing adapter second end therethrough, a motor shaft adapter second end coupled to the motor shaft; and a motor shaft adapter longitudinal axis spanning a length of the motor shaft adapter, and
  at least one fastening means moveably connecting the wing adapter within the motor shaft adapter, and defining movement of the wing adapter within the motor shaft adapter along at least one sliding groove of the motor shaft adapter;

b) rotating the at least one fastening means in a first direction to allow movement of the wing adapter relative to the motor shaft adapter;

c) moving the at least one fastening means and the wing adapter along the at least one sliding groove so that the at least one fastening means becomes located near the motor shaft adapter first end and the wing connector system is in an extended configuration;

d) folding the at least one wing member in a manner where the wing adapter longitudinal axis is rotated up to an angle of greater than 90 degrees relative to motor shaft longitudinal axis; and e) transporting the winged decoy, wherein substantially no damage to the winged decoy occurs through the folding of the at least one wing member.

2. The method of claim 1, further including the step f) of folding the at least one wing member in a manner where the wing adapter longitudinal axis is approximately co-linear with the motor shaft longitudinal axis.

3. The method of claim 2, further including the step g) of moving the at least one fastening means and the wing adapter along the at least one sliding groove so that the at least one fastening means becomes located near the motor shaft adapter second end and the wing connector system is in an operating configuration.

4. The method of claim 3, further including the step h) of rotating the at least one fastening means in a second direction to restrict movement of the wing adapter relative to the motor shaft adapter.

* * * * *